United States Patent
Glenn

(10) Patent No.: US 6,874,493 B2
(45) Date of Patent: Apr. 5, 2005

(54) STEERING GUIDE FOR CUTTING EQUIPMENT

(75) Inventor: J. Brandal Glenn, Boise, ID (US)

(73) Assignee: Multiquip, Inc., Boise, ID (US)

( * ) Notice: Subject to any disclaimer, the term of this patent is extended or adjusted under 35 U.S.C. 154(b) by 112 days.

(21) Appl. No.: 10/382,788

(22) Filed: Mar. 5, 2003

(65) Prior Publication Data

US 2004/0173198 A1 Sep. 9, 2004

(51) Int. Cl.$^7$ ................................................. B28D 1/04
(52) U.S. Cl. ........................ 125/12; 451/344; 451/353
(58) Field of Search ............................... 125/12, 13.01, 125/13.02, 13.03, 38; 451/344, 350, 352, 353, 358, 359

(56) References Cited

U.S. PATENT DOCUMENTS

| | | | | |
|---|---|---|---|---|
| 2,468,336 A | * | 4/1949 | Hurst | 299/39.3 |
| 2,673,725 A | * | 3/1954 | Coates | 299/39.3 |
| 3,357,745 A | * | 12/1967 | Cooper | 299/39.3 |
| 4,848,845 A | * | 7/1989 | Kennedy | 299/39.3 |
| 5,302,207 A | * | 4/1994 | Jurcisin | 118/713 |
| 5,381,780 A | * | 1/1995 | Yelton et al. | 299/39.3 |
| 5,564,408 A | * | 10/1996 | Bassols | 125/12 |
| 5,941,227 A | | 8/1999 | Bearden | |
| 5,950,612 A | | 9/1999 | Zuzelo et al. | |
| 6,112,736 A | | 9/2000 | Bearden | |
| 6,425,638 B1 | | 7/2002 | Kodama | |

* cited by examiner

*Primary Examiner*—Timothy V. Eley
(74) *Attorney, Agent, or Firm*—Franks J. Dykas; Dykas, Shaver & Nipper

(57) ABSTRACT

The present invention is a steering guide for surface cutting machines. The steering guide is made up of two sighting means that are connected to a surface cutting machine by a guide arm and are configured to align with the cutting edge portion of the saw blade. The first and second sighting means are visible by the sawyer while operating the device. Since the first and second sighting means are configured to align with the saw blade along a straight line, aligning the first and second sighting means with the guide line also aligns the cutting portion of the saw blade with the guideline. This enables the saw blade to be kept in alignment with the guideline while moving along a surface to be cut.

19 Claims, 4 Drawing Sheets

STEERING GUIDE FOR CUTTING EQUIPMENT

BACKGROUND OF THE INVENTION

1. Field of the Invention

The present invention generally relates to walk-behind and rideable power equipment, and more particularly to walk-behind and rideable cutting saws used to cut, saw, groove, or grind surfaces such as concrete or asphalt. More particularly, this invention also relates to a steering guide for such equipment.

2. Background Information

Concrete cutting equipment is used in the construction industry to cut concrete and other hard surfaces in a variety of ways and for a variety of reasons. One of the ways that a concrete saw is used is to cut out desired portions of concrete or asphalt or to cut or score a desired feature into a surface. Examples of such uses include: scoring a surface to provide a channel for water to drain, cutting a surface to allow the portions of the surface to rise and fall as the ground rises and falls, and cutting a surface to prevent or repair cracking. In some instances, cuts are made simply for decorative purposes or may be done simply as a part of removing or destroying a portion of a surface.

Typically, a surface to be cut is marked with a guiding line prior to cutting. This guiding line is typically made with an instrument such as a chalk line upon a surface and provides a desired path for the saw blade to follow. The operator or sawyer who controls the saw then attempts to run the blade of the cutting device along this line to cut the surface at this location. The aim of such a process is to obtain straight cuts. In addition to being aesthetically pleasing, straight cuts prevent the concrete from flaking along the edges of the cut and cause less stress and damage to the saw blade and the cutting device.

While straight cuts are desired, they are often times difficult to obtain. Most walk-behind type cutters are designed so that the operator walks behind the saw and the cutting blade is in front of the sawyer. Typically, a motor, housing, and/or other portions of the cutter obstruct the sawyer's view of the saw blade. In this configuration, maintaining the saw blade in proper alignment with the guide line is difficult and may even seem impossible as the sawyer cannot both operate the saw and watch the saw blade contact the guide line. As a result, a sawyer must sacrifice either time or accuracy in making cuts in the concrete surface.

In some instances, an indicator is attached to the front portion of the cutting machine. This indicator is intended to assist the sawyer in maintaining the saw in proper alignment with the guiding line. Typically, the indicator is a point attached to an arm that extends in front of the concrete cutter. The arm and the indicator are configured so as to provide a projected location of the saw blade and assist the sawyer in aligning the saw blade with the guiding line. While this idea functions in theory, in use several problems arise.

First, the indicator only provides one point of guidance upon the line. Since one point can have an infinite number of lines passing through it, simply maintaining the indicator on the guide line will not necessarily prevent the saw blade from moving in a variety of other directions. Hypothetically, the saw could rotate 360 degrees, while the point remained upon the line. Thus, the single point indicator that exists in the prior art does not assist the sawyer in determining whether or not small variations in alignment between the saw blade and the guideline have occurred. A sawyer may have the indicator placed upon the line and believe that, since the indicator is on the guideline, he is proceeding along the straight line. However, a variety of variations of the saw blade along the line may have occurred without being noticed or perceived by the sawyer. As a result, the cut made in the concrete may not be straight and may make the concrete prone to flaking and/or breakage.

While it is true that the person utilizing the saw could attempt to align the indicator and the saw blade to provide two points of alignment, this is inherently dangerous as it usually requires the operator to lean out over the saw to align the saw blade with the line. Another method of alignment requires the positioning of the saw blade and the line by constantly stopping, checking, and repositioning the saw blade along the line, which results in very slow progress being made in making the cut.

If the saw blade has deviated off the desired outlined course, some type of action must be taken to realign the saw blade with the guiding line. In realigning the saw blade with the guideline, irregularities in the cuts themselves may occur. These irregular cut lines destabilize the concrete and can cause the edges of the concrete to flake and/or break along its edges. In addition to poor quality cuts, the difficulty in obtaining and maintaining a straight cut line may also result in damage and breakage of cutting saw components such as motors and/or saw blades.

Therefore, what is needed is a steering guide that allows an operator of a concrete cutting device to maintain a saw blade in a straight line along a desired cutting path while operating the concrete cutting device. What is also needed is a steering guide that provides the sawyer with increased ability to ensure alignment of a cutting saw blade with a guiding line while operating the cutting saw. What is also needed is a steering guide with two points of alignment that allow a sawyer to move a saw blade along a guiding line with increased precision and accuracy.

Accordingly, it is an object of this invention to provide a steering guide for walk-behind cutting apparatuses that enables a sawyer to maintain the walk-behind construction apparatus in a desired alignment with a guiding line while traveling across a surface. Another object of the invention is to provide a concrete cutting machine with a steering guide that provides the operator with increased ability to maintain a saw blade in a desired location and positioned along a guiding line. Another object of the invention is to provide a steering guide with two sighting means that are visible by an operator while the operator is guiding the cutting saw along a desired path.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention is a steering guide for surface cutting machines. A typical walk behind surface cutting machine cuts a surface with a rotary saw blade that has a cutting edge. The saw blade is attached to a power motor which when directed causes the saw blade to rotate. The motor is mounted upon a platform and controlled through a control means such as a handle. The motor and the platform are typically covered by a housing. Usually, the platform is placed upon at least one set of wheels or other device that allows the entire cutting device to move across a surface.

The present invention is a steering guide made up of two sighting means. The steering guide is attached to a typical concrete cutting machine by a guide arm and is configured to extend out in front of the cutting machine in a position where the first and second sighting means are aligned with the cutting portion of the saw blade and are visible when the sawyer is in a position to operate the device. Since the first and second sighting means are configured to align with the saw blade along a straight line, aligning the first and second sighting means with the guiding line also aligns the cutting portion of the saw blade with the guideline.

Maintaining the guideline between both the first and second sighting means keeps the cutting portion of the saw blade aligned with the guiding line and assists the sawyer in making straight cuts in a surface. The guide arm and the sighting means are configured so that the first and second sighting means can be seen by the sawyer while positioned in an operating position behind the cutting machine. This allows the operator to align the cutting portion of the saw blade with the guiding line while operating the cutting machine and without having to stop the movement of the cutting machine. This feature also allows the operator of a cutting device to maintain the cutting device in proper alignment with a guiding line while proceeding across a surface.

Still other objects and advantages of the present invention will become readily apparent to those skilled in this art from the following detailed description wherein I have shown and described only the preferred embodiment of the invention, simply by way of illustration of the best mode contemplated of carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENTS

Figure 1:
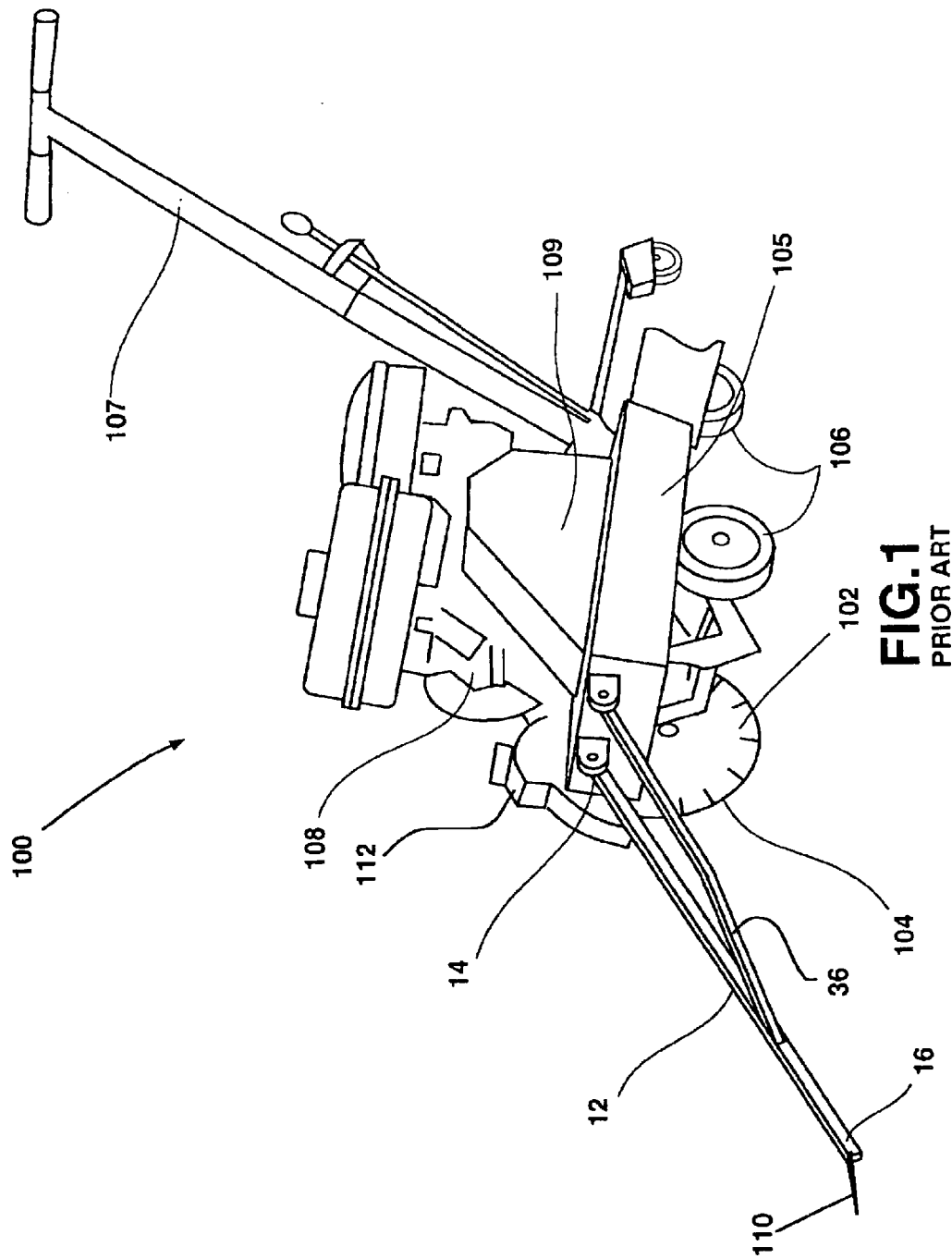
FIG. 1 is a prior art embodiment of a concrete cutting device having a prior art indicator.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The preferred embodiment of the invention and its use are shown in FIGS. 1–4. Referring now to FIG. 1, one embodiment of a typical walk-behind type concrete cutting device 100 is shown. While in this description of the preferred embodiment the present invention is described in the context of a walk-behind type concrete cutting device, it is to be distinctly understood that this embodiment is merely illustrative and that the present invention may be used on any of a variety of other types of devices wherein the ability to follow a straight guide line is desired. This would include other types of surface cutting equipment such as grinders, groovers where the sawyers that operator the machine(s) may either walk behind or ride upon. It is also to be distinctly understood that the present invention is not limited to these uses but may be variously embodied to use with other machines involving other types of materials and devices.

A typical walk-behind cutting device 100 has a rotary type cutting blade 102 having a cutting edge 104. The blade 102 is connected to a motor 108, which is positioned upon a platform 105. The platform 105 is then placed upon wheels 106 that allow the cutting device to be moved in a variety of directions across a surface. A handle 107 allows a saw operator or sawyer to control the movements of the cutting machine 100. In some embodiments, the handle 107 is configured to have a variety of controls for controlling the motor as well as other features and functions of the cutting device. In some embodiments, all or a portion of the platform 105, wheels 106, and blade 102 are encased within a housing 109.

A typical concrete or asphalt surface is prepared for cutting by marking a guideline upon the surface. Typically, this is done with a device such as a chalk line or other marking device that places a generally straight guideline upon the surface. This guideline shows a desired and designated path for the sawyer to follow as he/she moves the device across the surface to be cut. The aim of the sawyer is then to align the cutting edge portion 104 of the rotary blade 102 with this guideline so as to proceed in the desired direction. Many times, the sawyer's view of the saw blade 102 is obscured by a portion of the housing 109, a saw guard 112, or another portion of the cutting machine 100. Because the sawyer's view is obstructed, aligning the cutting edge portion 104 of the saw blade 102, which he/she cannot see, with the guide line that he/she is to follow is difficult. In order to align the cutting edge 104 and the guideline, the sawyer must stop the device and move from his/her operator's position to another position where both the saw blade and the guideline can be seen. This operation is time consuming because it requires the cutting machine to be periodically stopped. Alternatively, the sawyer could lean out over the cutting device while the device is running to make sure the guiding line is being followed. This, however, is dangerous to the sawyer and can result in undesired cutting or scarring of the surface to be cut.

One way of attempting to assist the sawyer in maintaining the proper positioning of the saw blade 102 with respect to the guideline is to place a saw blade indicator 110 out in front of the saw blade. The saw blade indicator 110 is connected to a guide arm 12. The guide arm 12 has a first end 14 attached to a portion of the cutting device 100 and extends from the first end of the device along the guide arm 12 to a second end 16 that is connected to the saw blade indicator 110. The saw blade indicator 110 is positioned to project a future position of the cutting edge portion 104 of the saw blade 102. The intent of the saw blade indicator 110 is to assist the sawyer in aligning the saw blade 102 with the guideline. Since a saw blade typically only has one point where it contacts the surface to be cut, most saw blade indicators 110 have only one point that marks the location where the saw blade 102 will be in a future position.

In use, an operator stands behind the cutting device 100 and attempts to guide the saw blade 102 along the guiding line utilizing the single guiding point provided by the saw blade indicator 110. With only one point for alignment, many times the indicator 110 will be placed upon the line while the cutting edge 104 of the saw blade 102 is not properly aligned with the guiding line. As a result, the saw blade 102 does not follow the indicator 110 along the designated guideline. This results in cuts being made that are not properly placed in the concrete surface. The amount of wear and fatigue on the machines are increased and the resulting cuts are many times irregular and crooked. These irregular cuts destabilize the concrete along its margins making the edges of the surface susceptible to flaking and/or breakage.

Figure 2:
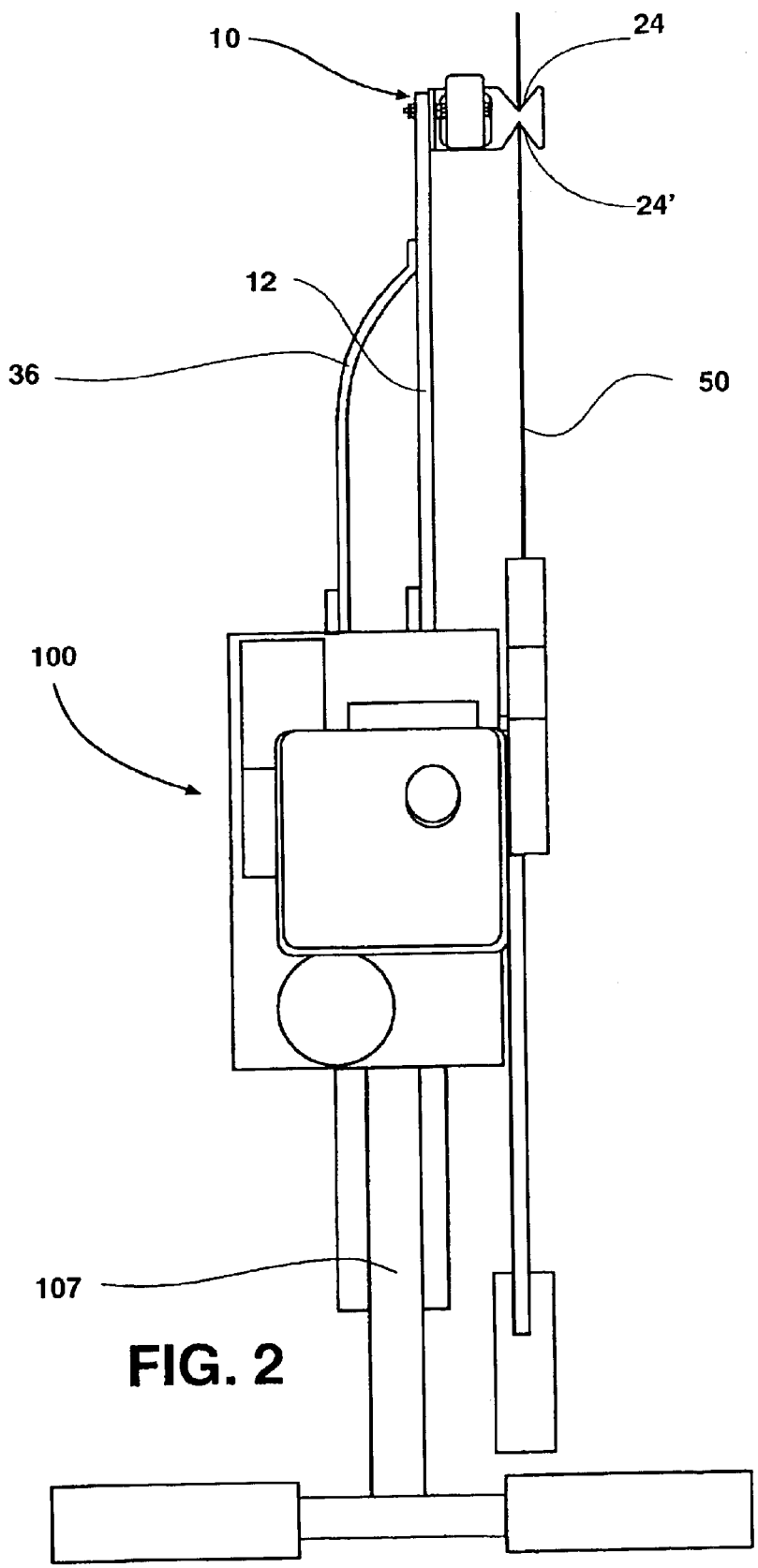
FIG. 2 is a top plan view of a concrete cutting device with the present steering guide invention attached.

The present invention is an improved steering guidance device that overcomes these problems. FIG. 2 shows a top plan view of the present invention as connected to a typical concrete cutting device 100. This view is similar to the view that an operator or sawyer would have from a operating position of the device. From this position, the sawyer can view the handle 107, the top portion of the cutting device 100, the guide arm 12, and the sighting device 10. In some embodiments, a brace arm 36 is also included to support and maintain the guide arm 12 in a desired position. The cutting portion of the saw blade (shown in FIG. 1) cannot be seen in this view.

The present invention alleviates the aforementioned problems associated with the prior art by replacing the single point blade indicator 110 of the prior art with a steering guide 10. This steering guide 10 has at least two sighting means 24, 24'. These sighting means 24, 24' are positioned to align with the saw blade portion (shown in FIG. 1) of the cutting device along a straight line. This configuration allows the operator to place and maintain the cutting portion of the saw blade (shown in FIG. 1 and not visible in this view) in a desired orientation and alignment with respect to a pre-placed guideline 50 from an operating position behind the cutting device 100.

Figure 3:
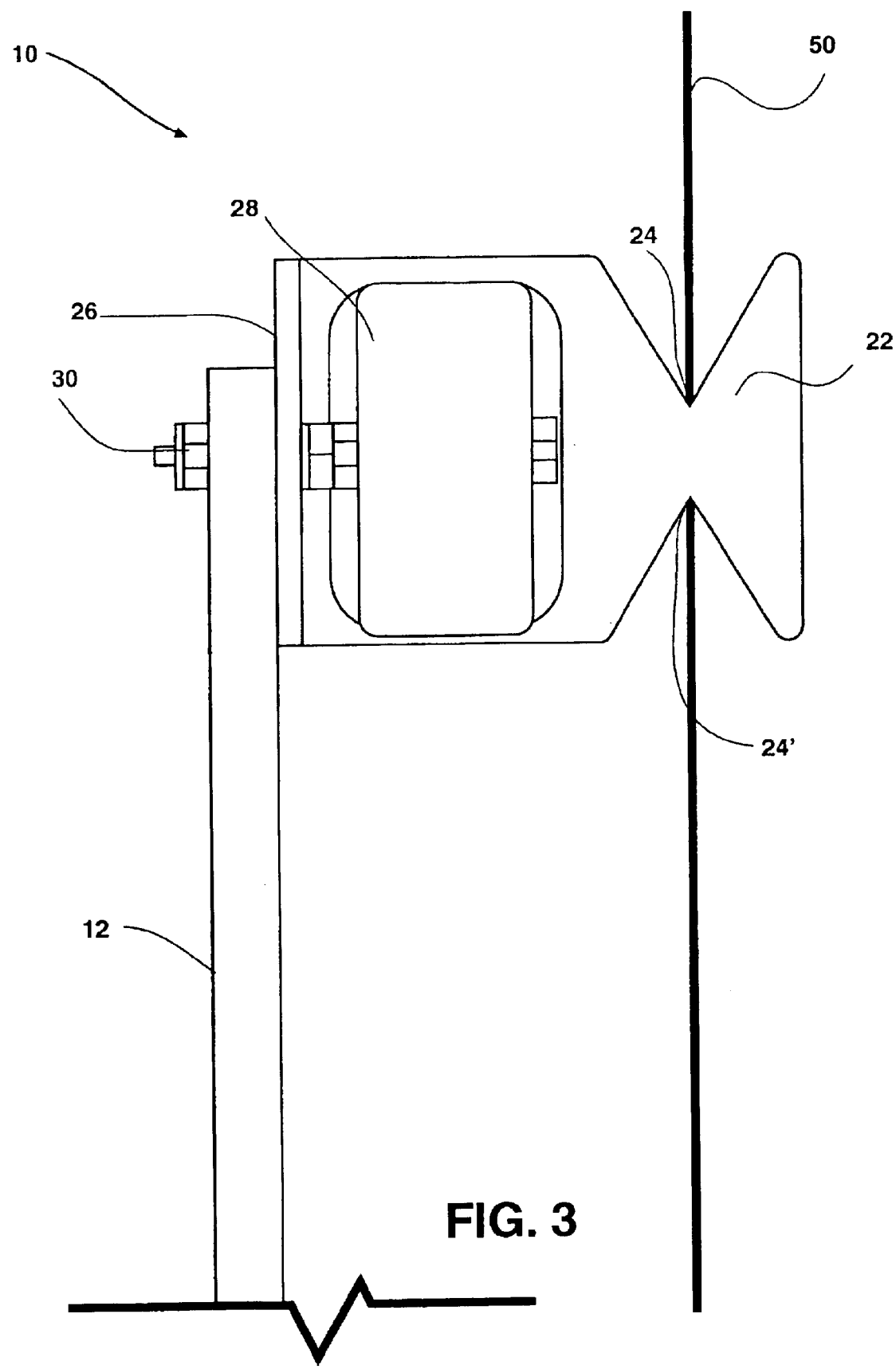
FIG. 3 is a detailed top plan view of the preferred embodiment of the present invention.

A detailed top view of the front line guidance device 10 is shown in FIG. 3. The front line guidance device 10 is made up of a flat pointer plate 22 having two sighting means 24, 24' connected to it. These sighting means 24, 24' are configured to align with one another as well as with the cutting edge portion of the saw blade (shown in FIG. 1). While in this embodiment of the present invention the two sighting means 24, 24' are generally v-shaped apertures formed within the flat pointer 22, it is to be understood that a variety of other devices and structures may be utilized as sighting means. In other variations of this same invention, the sighting means 24, 24' could be two points formed by projections that are aligned with the saw blade, or could be apertures of various sizes, shapes, and dimensions. The shape, size, and dimensions of the sighting means may be of any size, shape or dimension as long as the sawyer has the ability to view and align a guide line 50 between the two sighting means 24, 24' from his position behind the concrete cutter.

The alignment of the two sighting means 24, 24' with the cutting edge of the saw blade (shown in FIG. 1) allows the operator to align the cutting edge portion of the blade with the guideline by aligning the two sighting means 24, 24' on a guideline. By moving the cutting device 100 forward along this guide line 50 and maintaining the guide line 50 in both the first and second sighting means 24, 24', the cutting portion of the saw blade (shown in FIG. 1) follows the guideline 50 and makes a straight cut into the desired surface.

In this embodiment, the two sighting means 24, 24' are apertures defined within a flat plate 22. The flat plate 22 in this embodiment is made of a stamped piece of metal. However, it is to be understood that a variety of other materials and shapes may also be utilized to accomplish the purposes of the flat pointer plate 22 that is shown in the present invention. In this embodiment of the invention, the flat pointer plate 22 is positioned for connection with the guide means 12 through a connection plate 26 that is generally perpendicularly attached to the flat pointer 22. The connection plate is attached to the guide means 12 through an attachment means 30.

In order to facilitate movement of the guidance device along a guideline, a roller 28 is utilized to suspend the flat pointer 22 above the surface to be cut and to assist the guiding device 10 in moving along in front of the cutting device 100. The roller 28 also helps to maintain the alignment between the sighting means 24, 24' and the cutting edge of the saw blade (shown in FIG. 1). While a single roller 28 is shown as a portion of the preferred embodiment of the invention, it is to be distinctly understood that such a configuration is only the preferred embodiment and that a variety of other embodiments may also be variously embodied to achieve the same desired results as those that are set forth in this description. These embodiments include variations both with and without a rolling means for moving the guiding device across a surface.

In this preferred embodiment of the invention, a portion of the roller 28 is inserted through a cut out portion of the flat pointer plate 22 and is attached to the guide arm 12 by an attachment means 30. This attachment means 30 is configured to tightly attach the flat plate 22 to the guide arm 12 while simultaneously allowing the roller 28 to freely rotate. In this preferred embodiment, the attachment means is a bolt. However, other mechanisms that perform this same function may also be used and are contemplated by this invention. As the device moves forward, the roller 28 rolls, maintaining the flat pointer 22 in an aligned and elevated position with regard to the surface cutting portion of the saw blade and the predetermined guide line 50.

Figure 4:
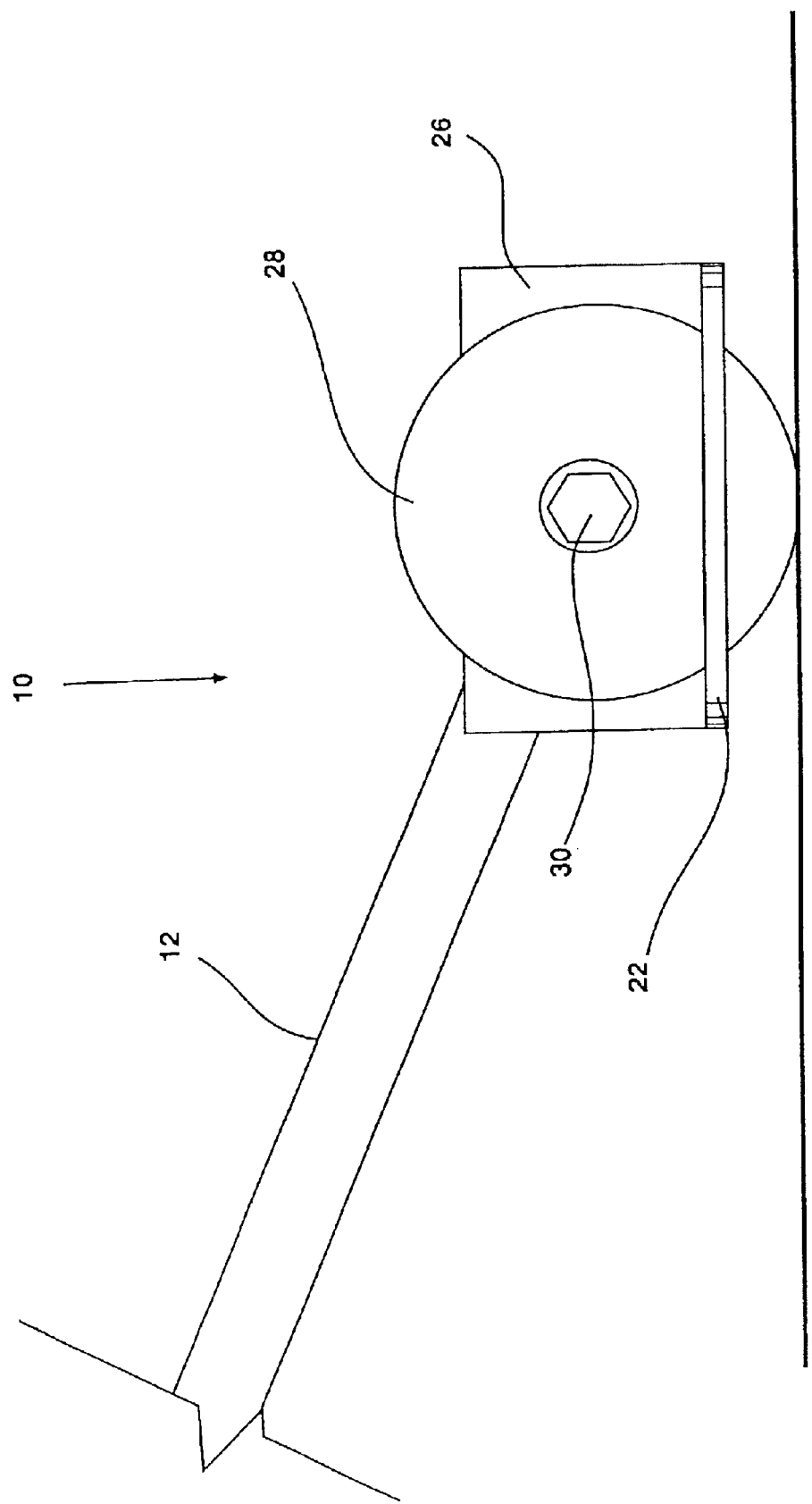
FIG. 4 is a detailed side view of the preferred embodiment of the present invention.

In FIG. 4, a detailed side view shows the horizontal orientation of the roller and connection plate shown in FIGS. 2 and 3 of the present invention. The roller 28 is configured to suspend the flat plate 22 above the surface to be cut. While the positioning of the steering guide 10 works best in this position, this configuration is not handy for storage. Therefore, guide brace 12 and the brace arm 36, if present, are configured to be pivotally attached to the housing or a platform portion of the surface cutter and allow the guide arm 12 and the brace arm 36 to be raised to an elevated position when so desired by the operator. In other embodiments of the invention, these same results may be obtained by configuring the arms of the invention so that all or a part of the arms are configured to be bent up for easy storage. In addition, other means of providing for storage may be accomplished by providing the device with arms made up of sliding lengths or by providing the device with telescoping arms.

While this embodiment of the invention is described in the context of a surface cutting machine, it is to be understood that its applications are not limited thereto. Other embodiments of such a device may be utilized with other cutting machines. These include a variety of walk behind cutting devices, as well as handheld devices for cutting a variety of other materials including metal, wood, sheetrock, etc. In addition, while the type of cutting device upon which the device is shown has a rotary type of blade, it is to be understood that the type of blade that is utilized by the various cutting instruments may be varied all without changing the operative principal of the invention as set forth in this application and disclosure.

This preferred embodiment of the invention has a variety of uses and enables a sawyer to cut a surface by following a designated line in a manner that is more rapid and expeditious than other means previously shown in the prior art.

While there is shown and described the present preferred embodiment of the invention, it is to be distinctly understood that this invention is not limited thereto but may be variously embodied to practice within the scope of the following claims. From the foregoing description, it will be apparent that various changes may be made to the embodiments of the invention all without departing from the spirit and scope of the invention as defined by the following claims.

I claim:

1. A steering guide configured for use with a cutting device, said cutting device having a cutting saw blade, said cutting saw blade having a cutting edge, said steering guide comprised of:
   a first sighting guide and a second sighting guide, said first sighting guide and said second sighting guide positioned along a single line, said first sighting guide and said second sighting guide configured to align with said cutting edge of said saw blade along a single straight line, said first and said second sighting guides positioned close enough together so as to allow both the first point and the second point so as to be seen by a saw operator while operating said walk-behind cutting device.

2. The steering guide of claim 1 wherein said sighting guides comprise projections defining a pair of points.

3. The steering guide of claim 1 wherein said sighting guides are apertures defined within a plate, said apertures configured to linearly align with said cutting edge of said saw blade along a line.

4. The steering guide of claim 3 wherein said sighting guides comprise generally v-shaped slots defined within at least one plate.

5. The steering guide of claim 1 further comprising a mover for moving said first and second sighting guides along a surface.

6. The steering guide of claim 5 wherein said mover for moving said first and second sighting guides along a surface comprises at least one roller.

7. The steering guide of claim 1 wherein said first and second sighting guides are connected to said cutting device by a guide arm, said guide arm having a first end connected to a portion of said walk-behind cutting device, said guide arm extending from said first end along a length to a second end, said second end connected to said first and second sighting guides.

8. The steering guide of claim 7 further comprising a brace arm, said brace arm having a first end connected to said cutting device and a second end connected to said guide arm.

9. The steering guide of claim 7 wherein said guide arm is pivotally connected to said cutting device and said guide arm is configured to be alternatively raised to a generally upright position and lowered to a generally horizontal position.

10. A steering guide attachment for a cutting saw, said cutting saw having a saw blade, said steering guide attachment comprising:
    a first sighting guide connected to a second sighting guide, said first and second sighting guides connected to said cutting saw by a guide arm, said first and second sighting guides positioned along the same line and said first and second sighting guides configured to align with said saw blade along a single line, said guide arm and said first and second sighting guides also configured to allow an operator of said cutting saw to view said first and said second sighting guides while operating said cutting saw, said first and second sighting guides connected to a mover, said mover configured to assist said first and second sighting guides to move across a surface.

11. The steering guide attachment of claim 10 wherein said mover comprises at least one roller, said roller connected to said first and second sighting guides and configured to move said first and second sighting guides across a surface.

12. The steering guide attachment of claim 10 wherein said first and second sighting guides comprise pointing projections.

13. The steering guide attachment of claim 10 wherein said first and second sighting guides are apertures defined within a plate.

14. The steering guide attachment of claim 10 wherein said first and second sighting guides are slots defined within a plate.

15. The steering guide attachment of claim 14 wherein said slots are generally v-shaped.

16. The steering guide attachment of claim 10 wherein said mover is a wheel having an axle there through, said wheel connected to said first and second sighting guides and configured to suspend said sighting guide above a surface.

17. The steering guide attachment of claim 10 further comprising a brace arm, said brace arm connected to said guide arm and to said cutting device, said brace arm configured to support said guide arm.

18. A concrete cutting saw comprising:
    a rotary saw blade having a cutting edge, said saw blade connected to a drive means;
    said drive means mounted upon a platform, said drive means and said platform having a portion covered by a housing, said platform supported by a wheeled assembly;
    said platform connected to a handle, said handle configured for steering said concrete cutting saw;
    a saw blade guide pivotally connected to said housing, said saw blade guide comprised of a guide arm having a first end pivotally connected to said housing and extending along a length to a second end, said second end removably connected to a flat pointer plate and to a roller wheel, said flat pointer plate defining at least two linearly disposed generally v-shaped slots within said plate, said slots configured to align with said cutting edge of said rotary saw blade, said flat pointer further defining an aperture, said aperture configured to allow passage of a portion of said roller wheel there through, said steering guide further comprising a brace arm having a first end pivotally connected to said housing and extending along a length of said brace arm to connect with said guide arm, said steering guide configured to be alternatively raised to a generally upright resting position and lowered to a generally horizontal guiding position, in said horizontal position said roller contacts a surface to be cut and said v-shaped slots align with said cutting edge of said saw blade along a line defining a generally straight path for said saw blade to cut, said concrete saw configured so that said v-shaped apertures are visible by an operator of said concrete saw while operating said concrete saw.

19. A steering guide configured for use with a cutting device, said cutting device having a cutting saw blade, said cutting saw blade having a cutting edge, said steering guide comprised of:

a first sighting guide and a second sighting guide, said first sighting guide and said second sighting guide configured to align with said cutting edge of said saw blade along a straight line, said first and said second sighting guides positioned so as to be seen by a saw operator while operating said walk-behind cutting device, said sighting guides being apertures defined within a plate, said apertures configured to linearly align with said cutting edge of said saw blade along a line.

* * * * *